US010764181B2

(12) United States Patent
Singh et al.

(10) Patent No.: US 10,764,181 B2
(45) Date of Patent: Sep. 1, 2020

(54) PIPELINED EVALUATIONS FOR ALGORITHMIC FORWARDING ROUTE LOOKUP

(71) Applicant: Amazon Technologies, Inc., Seattle, WA (US)

(72) Inventors: Bijendra Singh, Cedar Park, TX (US); Thomas A. Volpe, Austin, TX (US); Kari Ann O'Brien, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/194,085

(22) Filed: Nov. 16, 2018

(65) Prior Publication Data
US 2019/0149472 A1 May 16, 2019

Related U.S. Application Data

(63) Continuation of application No. 14/981,664, filed on Dec. 28, 2015, now Pat. No. 10,135,734.

(51) Int. Cl.
*H04L 12/743* (2013.01)
*H04L 29/06* (2006.01)
*H04L 12/713* (2013.01)
*H04L 12/749* (2013.01)
*H04L 12/745* (2013.01)

(52) U.S. Cl.
CPC .......... *H04L 45/7453* (2013.01); *H04L 69/22* (2013.01); *H04L 45/586* (2013.01); *H04L 45/741* (2013.01); *H04L 45/748* (2013.01)

(58) Field of Classification Search
CPC . H04L 45/7453; H04L 45/586; H04L 45/741; H04L 45/748; H04L 69/22
See application file for complete search history.

(56) References Cited

U.S. PATENT DOCUMENTS

| 6,581,106 B1 | 6/2003 | Crescenzi et al. |
| 6,711,153 B1 | 3/2004 | Hebb et al. |
| 7,782,853 B2 | 8/2010 | Huang et al. |

(Continued)

OTHER PUBLICATIONS

Seunghyun Oh and Yangsun Lee; The Bitmap Trie for Fast Prefix Lookup; 2003 (Year: 2003).*

(Continued)

*Primary Examiner* — Ricky Q Ngo
*Assistant Examiner* — Stephen N Steiner
(74) *Attorney, Agent, or Firm* — Robert C. Kowert; Kowert, Hood, Munyon, Rankin & Goetzel, P.C.

(57) ABSTRACT

Packet processors or other devices with packet processing pipelines may implement pipelined evaluations of algorithmic forwarding route lookups. As network packets are received, a destination address for the network packets may be divided into different possible prefix lengths and corresponding entries in a routing table for the different possible prefix lengths may be determined according to a hash scheme for the routing table. The entry values may be read from the routing table and evaluated at subsequent stages to identify the entry with a longest prefix match with respect to the destination address for the network packet. The routing table may include entries for different types of network packets and may be configured to include virtual routing and forwarding for network packets.

17 Claims, 10 Drawing Sheets

(56) References Cited

U.S. PATENT DOCUMENTS

| | | |
|---|---|---|
| 7,924,839 B2 | 4/2011 | Rajgopal et al. |
| 8,566,337 B2 | 10/2013 | Smith et al. |
| 10,135,734 B1 | 11/2018 | Singh et al. |
| 2004/0255045 A1 | 12/2004 | Lim et al. |
| 2008/0084881 A1* | 4/2008 | Dharwadkar ....... H04L 12/4641 370/392 |
| 2011/0128960 A1* | 6/2011 | Bando ................... H04L 45/745 370/392 |
| 2014/0244779 A1 | 8/2014 | Roitshtein et al. |
| 2015/0124805 A1 | 5/2015 | Yadav et al. |

OTHER PUBLICATIONS

F. Pong, et al., "Concise Lookup Tables for IPv4 and IPv6 Longest Prefix Matching in Scalable Routers," IEEE/ACM Transactions on Networking, vol. 20, No. 3, Jun. 2012, pp. 729-741.

F. Pong et al., "SUSE: Superior Storage-Efficiency for Routing Tables through Prefix Transformation and Aggregation," IEEE/ACM Transactions on Networking, vol. 18, No. 1, Feb. 2010, pp. 81-94.

U.S. Appl. No. 14/966,504, filed Dec. 11, 2015, Bijendra Singh, et al.

* cited by examiner

PIPELINED EVALUATIONS FOR ALGORITHMIC FORWARDING ROUTE LOOKUP

This application is a continuation of U.S. patent application Ser. No. 14/981,664, filed Dec. 28, 2015, which is hereby incorporated by reference herein in its entirety.

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to increase the capacity and/or reduce the latency of processing network packets in a network. However, increasing networking device performance is not without cost. Powering devices to handle high workloads at great speed, for example, may be subject to various physical limitations, such as heat generated by power intensive networking devices, so that without certain power budgets or others limitations, networking devices may be unable to handle the workloads sustainably. Other limitations, such as chip area, may limit the amount of resources that may be applied to increase network processing capacity. Therefore, techniques that provide efficient utilization of networking device resources without sacrificing performance may be desirable.

Figure 1:
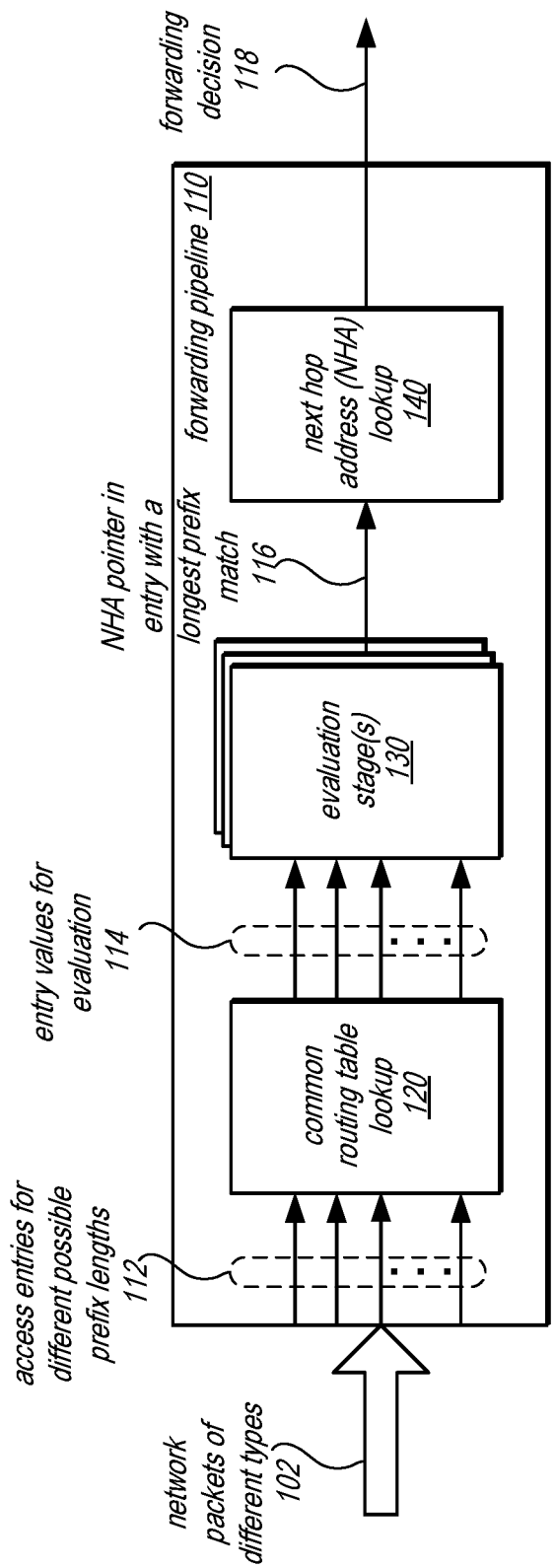
FIG. 1 illustrates a logical block diagram of pipelined evaluations for algorithmic forwarding route lookups, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement pipelined evaluations for algorithmic forwarding route lookups. Network packets are packets of data (e.g., datagrams) sent across a network from a source networking device (e.g., a network interface card implemented at a computer or server) to a destination address representing an end networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. For example, a next hop address may be determined which identifies the next immediate destination to which the network packet may be sent. Once a forwarding decision is made, modifications to the packet may be performed, and the packet sent to a next networking device connected to the current networking device (or the network packet may be dropped). Forwarding of the network packet may continue amongst the networking devices of a network until the network packet reaches the desired destination.

A forwarding route may be an address or portion of an address which if matching a destination address for a network packet identifies forwarding decisions to be made with respect to the network packet, such as a next hop address. In some instances, multiple forwarding routes may match a destination address, so a forwarding decision scheme, such as longest prefix matching, may be implemented to always choose as the forwarding decision the forwarding route that matches the longest portion of the destination address starting from the most significant bit of the destination address. In order to facilitate quickly identifying the appropriate forwarding address for a network packet various mechanisms have been developed. Content Addressable Memory (CAM), such as a ternary CAM (TCAM), may be used to perform a comparison function with respect to the destination address and forwarding routes. In scenarios, random access memory (RAM) may be implemented to store forwarding routes and thus an algorithmic lookup mechanism, such as a hash scheme, may be logically imposed on forwarding routes stored in the RAM.

As the number of forwarding routes that may be maintained in a packet processor or networking devices grows, the speed at which forwarding routes are identified and efficiency at which the forwarding routes may be stored become vital to provide high performance packet processing. When network protocols change, however, such tasks become even more challenging. For instance, one type of network packets have been typically implemented utilizing Internet Protocol version 4 (IPv4) which provides a standard format for identifying unique locations through a 32 bit address. However, newer types or standards, such as Internet Protocol version 6 (IPv6), are becoming more popular and result in different network packet configurations, such as network addresses represented in 128 bits for IPv6 network packets. In order to support processing the different types of network packets, typical implementations rely upon one or more separate components or techniques that are specially configured for the type of network packet. For example, different memory components may be implemented to store different routing tables for different types of network packets, a routing table for IPv4 network packets and a routing table for IPv6 network packets. The cost (e.g., chip area or power consumed) to provide multiple implementations of forwarding route lookups may grow beyond available resources for performing forwarding route lookups and/or may reduce overall performance.

In various embodiments, pipelined evaluations of forwarding route lookups may provide a common processing pipeline for different types of network packets. Forwarding routes for different types of network packets may, for instance, be stored in a common table at common memory devices. Common evaluation and other processing stages may be implemented so that a longest prefix match for different types of network packets may be performed without relying upon different hardware and/or software configurations. In this way, processing resources may be efficiently shared between different types of network packets in order to perform forwarding route lookups.

Additionally, pipelined evaluations may streamline the tasks to be performed when determining a forwarding route. Instead of iterative memory access operations to lookup different routing table entries, or different memory components storing different routing entries, parallel read operations may be performed to obtain all of the forwarding route information used to select a longest prefix match in a single stage. Subsequent pipeline stages may then perform the various comparisons used to select the longest matching prefix for a network packet. Moreover, providing pipelined evaluations for forwarding lookups allows for each stage of the processing pipeline to process a different network packet at each clock cycle, allowing full utilization of the pipeline.

FIG. 1 illustrates a logical block diagram of pipelined evaluations for algorithmic forwarding route lookups, according to some embodiments. Forwarding pipeline 110 may be a hardware and/or software-based forwarding pipeline, such as may be implemented at a packet processor like packet processor 250 discussed below with regard to FIGS. 2 and 3. Forwarding pipeline may implement different stages to identify a forwarding route and corresponding forwarding decision for a network packet. For instance, as illustrated in FIG. 1, some of the stages forwarding pipeline 110 implements include common routing table lookup 120, to perform access operations to read different entries in a routing table, evaluation stage(s) 130, which perform one or multiple operations to compare data read from the entries to identify an entry with a longest prefix match with respect to a destination address for a network packet, and a next hop address (NHA) lookup stage to determine an egress port and/or other instructions to carry out a forwarding decision for a network packet.

Figure 7:
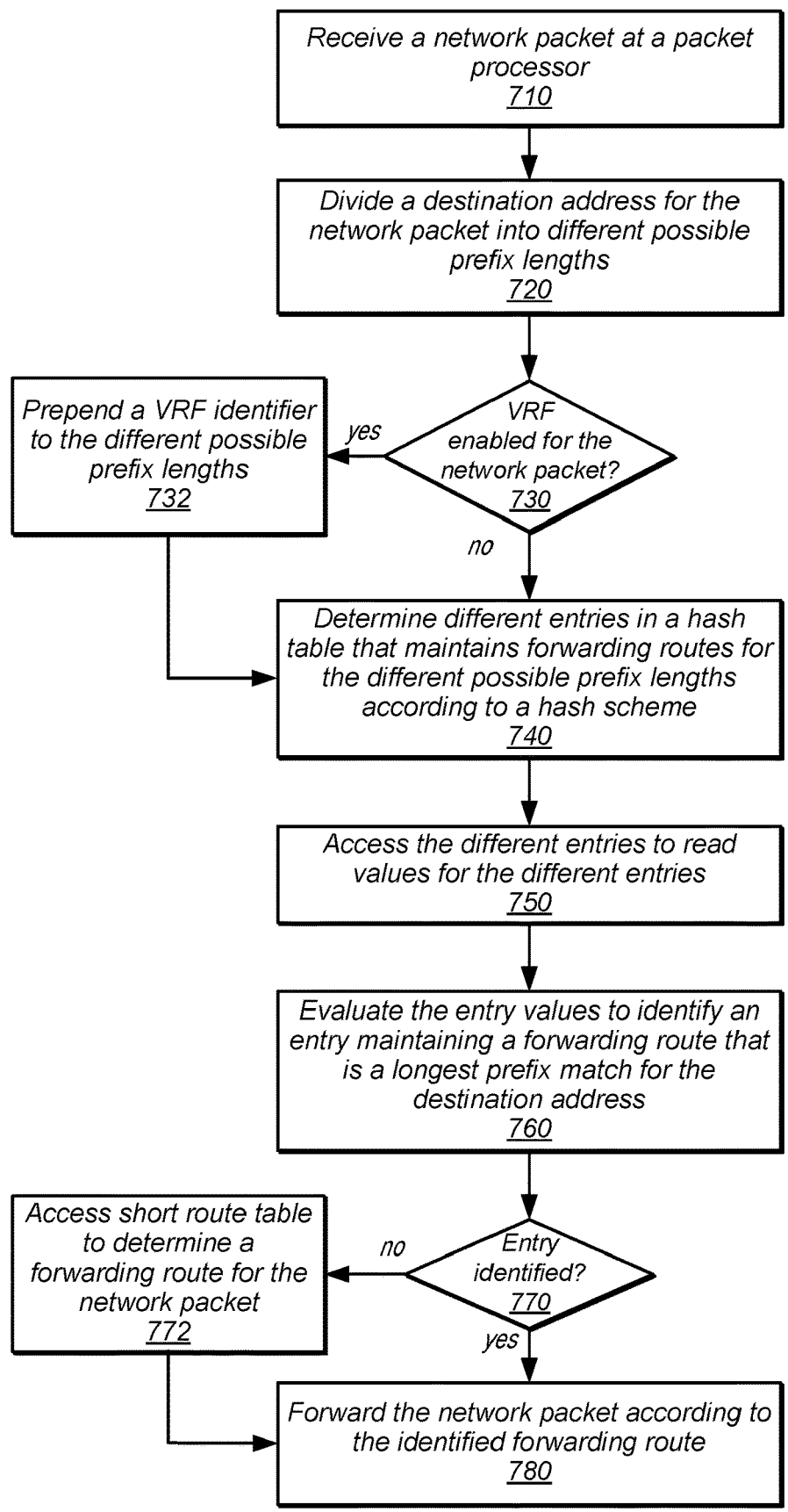
FIG. 7 is a high-level flowchart illustrating various methods and techniques to implement pipelined evaluations for algorithmic forwarding route lookups, according to some embodiments.

Different types of network packets 102 may be received at forwarding pipeline 110. For instance, both IPv4 and IPv6 packets may be received at forwarding pipeline 110. The path the different types of network packets take through forwarding pipeline 110 is the same. For example, as forwarding routes may have different possible lengths, a destination address may be divided into multiple different possible prefix lengths in order to evaluate whether at each of the different possible prefix lengths a match with a forwarding route exists. Thus access 112 to entries for the different possible prefix lengths may be made to a common routing table via common routing table lookup stage 120. Entries in the common routing table may be distributed amongst different routing table segments so that access 112 for the different possible prefix lengths may be performed at once. For example, an entry for a forwarding route at one possible prefix length would be stored in a different routing table segment than an entry for another possible prefix length so that both segments may be accessed for the different possible prefix lengths in parallel. FIGS. 7 and 11, discussed below, provide various examples of organizing a routing table to ensure parallel access for pipelined evaluations of a destination route.

Segments of a routing table may be organized according to a hash scheme, the entries to access in the segments of the routing table may be determined according to the hash scheme. For example, in at least some embodiments, a hash scheme may be implemented based on polynomial division. Such a hash scheme relies upon the understanding that two distinct polynomials can be differentiated by their respective unique pairs of quotients and remainders. Thus, polynomial division may be performed utilizing a common polynomial with respect to forwarding route to determine a remainder and quotient pairing that is unique. The forwarding route may be maintained (stored or represented) in an entry associated with (e.g., indexed to) the remainder. For example, the remainder may be used to identify a hash bucket or group of entries for which the polynomial division produces the same remainder. Entries within a hash bucket may also store the corresponding quotients that are paired with the remainder value, uniquely identifying the entry as derived from a particular forwarding route. Thus, when accessing an entry for a possible prefix length of a destination address, polynomial division may be performed to generate a quotient and remainder. The remainder may be used to determine the hash bucket in which the corresponding entry with a matching quotient (or other value derived from the quotient) is stored. The quotient may be compared with the stored quotients of the different entries in the hash bucket to determine a corresponding entry.

Figure 4:
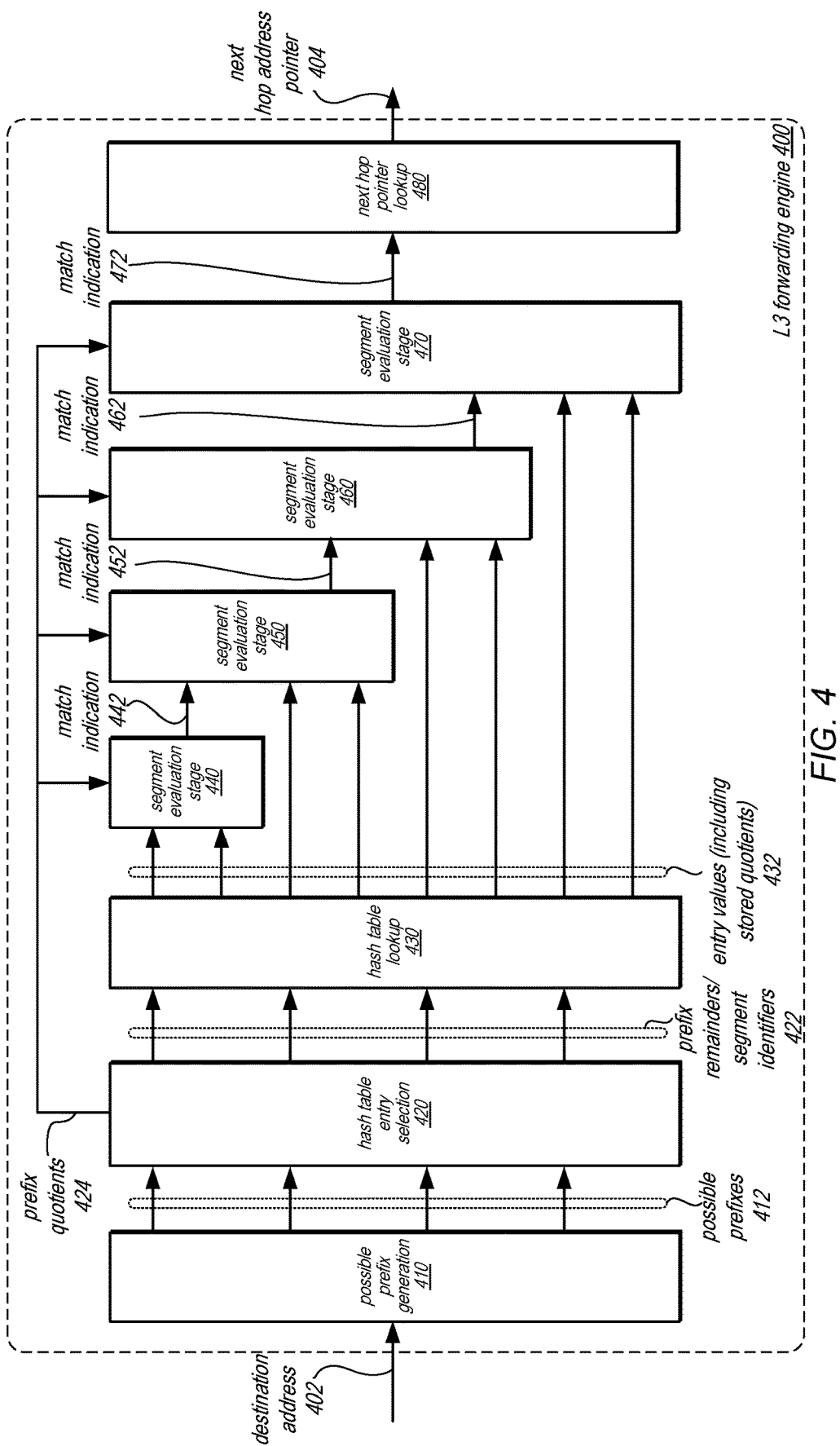
FIG. 4 is a logical block diagram illustrating a forwarding engine that utilizes pipelined evaluations for algorithmic forwarding route lookups, according to some embodiments.

As indicated at 114, entry values may be provided to evaluation stage(s) 130 which may determine which entry contains the longest matching prefix that matches the destination address of a network packet. For example, as illustrated in FIG. 4, different evaluation stages may be situated so that each evaluation stage analyzes a different segment of a destination address starting with the most significant segment of the address to the least significant segment of the address so that the last stage which identifies a matching entry inherently provides the longest matching prefix entry. Entries may also include a pointer value and/or mapping information to determine a pointer to a next hop address table. Thus, a pointer for the identified entry with the longest matching prefix may be determined and used 116 at NHA lookup 140. The NHA entry may then provide forwarding decision 118 so that forwarding of the network packet may be performed accordingly.

Please note that the previous description of pipelined evaluations for algorithmic forwarding route lookups is not intended to be limiting but is provided as a logical example of pipelined. The organization of components, stages, and other depicted items may be different than those illustrated in FIG. 1. Additionally, other stages, such as stages to determine possible prefix lengths or handle network packets that do not identify a matching forwarding route, such as a short route table discussed below with regard to FIGS. 8 and 9 may be implemented.

This specification begins with a general description of a networking device, which may utilize of pipelined evaluations for algorithmic forwarding route lookups to perform forwarding of network packets at a packet processor. Then various examples of a packet processor are discussed, including different components/modules, or arrangements of components/modules that may be implemented to perform various techniques including of pipelined evaluations for algorithmic forwarding route lookups. A number of different methods and techniques to implement of pipelined evaluations for algorithmic forwarding route lookups are then discussed, some of which are illustrated in accompanying flowcharts. Various examples are provided throughout the specification.

Figure 2:
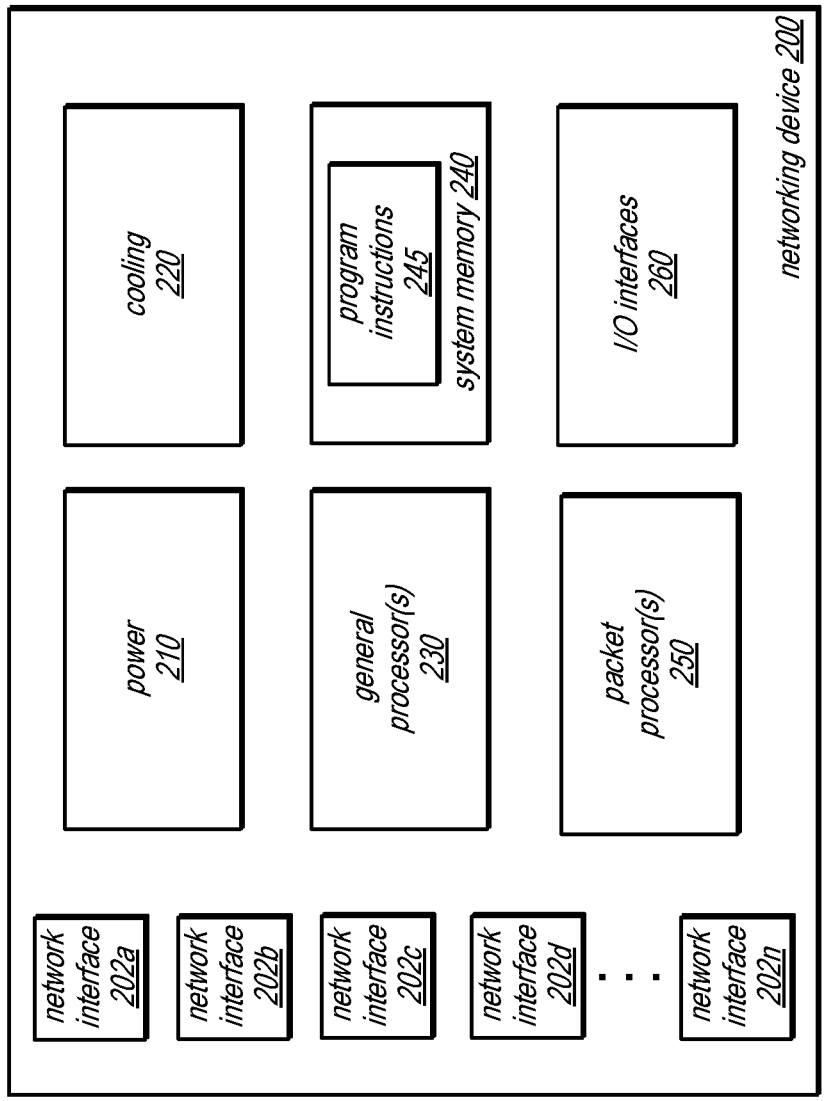
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, action tables, insert or remove forwarding routes, etc.). Additionally, a controller may be able to access network packets trapped or logged by a packet processor 250 for further analysis and direct processing actions to be performed by packet processor 250 for the network packet. In at least some embodiments, a controller may be able to extract trace information from a network packet and provide the trace information for analysis (e.g., to another application executing on processor(s) 230 or sending the trace information over a network connection to a different system for analysis).

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
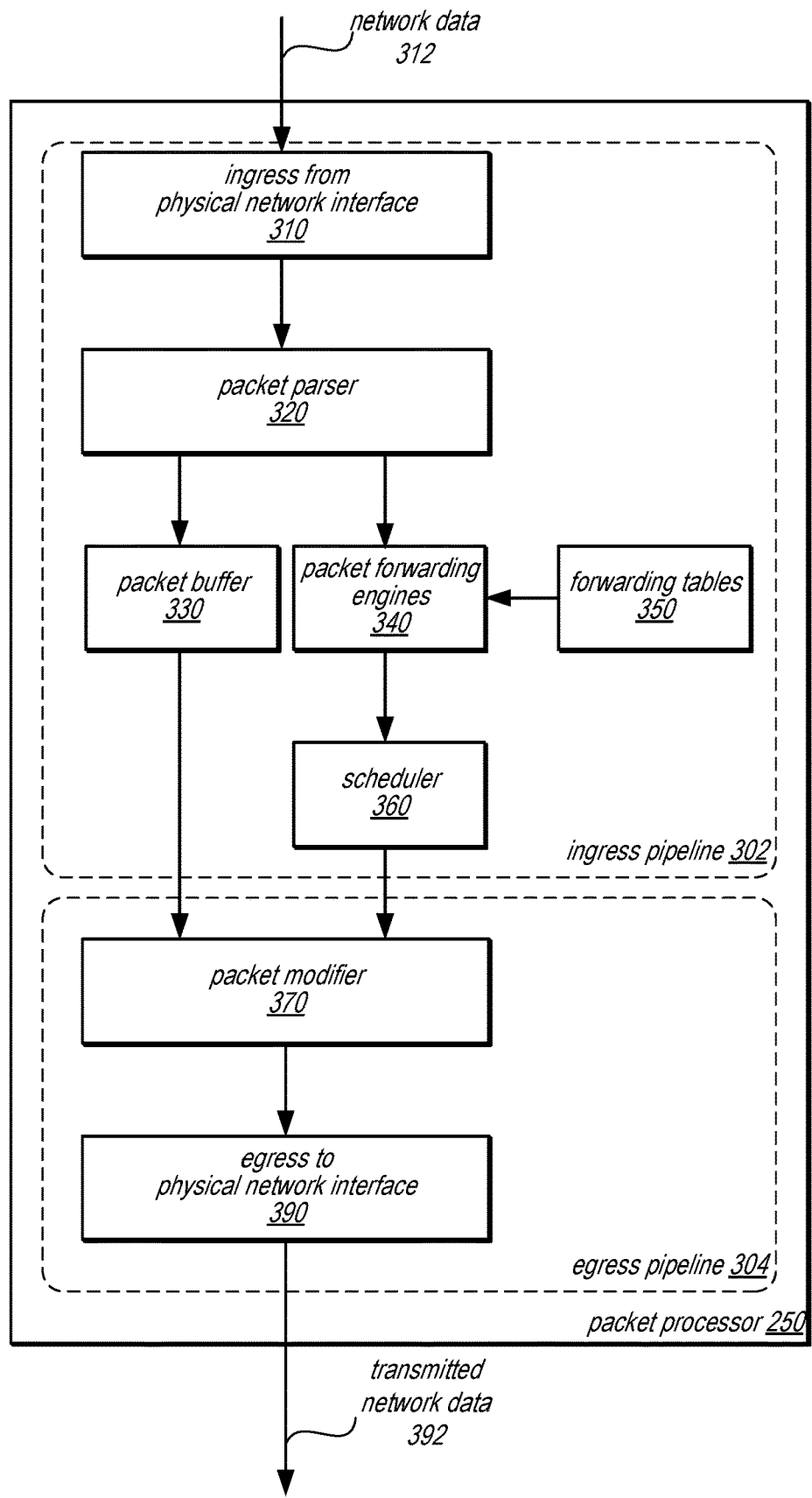
FIG. 3 is a logical block diagram illustrating a packet processor that process network packets utilizing pipelined evaluations for algorithmic forwarding route lookups, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), or other dedicated circuitry that performs packet processing, such as a System on a Chip (SoC). Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that process network packets utilizing pipelined evaluations for algorithmic forwarding route lookups, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312

(e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340.

Packet forwarding engines 340 may access data stored in packet tables 350 to make forwarding and tunneling decisions for the network packet based on information in the packet header (e.g., packet metadata) extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port identified in the packet header. If the MAC address is known but attached to a different port than indicated in the MAC address table, then an operation may be performed to move the source MAC address to the port identified in the packet header. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in layer 3 (L3) portions of the packet to perform L3 forwarding, such as L3 forwarding engine 400 discussed in FIG. 4 below, in some embodiments. For example, internet protocol (IP) headers for the packet may be evaluated with respect to entries in tables, such as a routing or next hop table, to determine forwarding to be performed. Please note that the previous examples of packet forwarding engines 340 is not exhaustive, as many other forwarding decisions may be made, including, but not limited to, forwarding engines for spanning tree protocol (STP) state checking, access port virtual LAN (VLAN) handling, VLAN membership checking, MAC2ME lookup, broadcast/multicast forwarding to a host CPU for the switch (e.g., CPU(s) 230), tunnel start/termination lookup, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a CAM, such as a TCAM, and/or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

Figure 5:
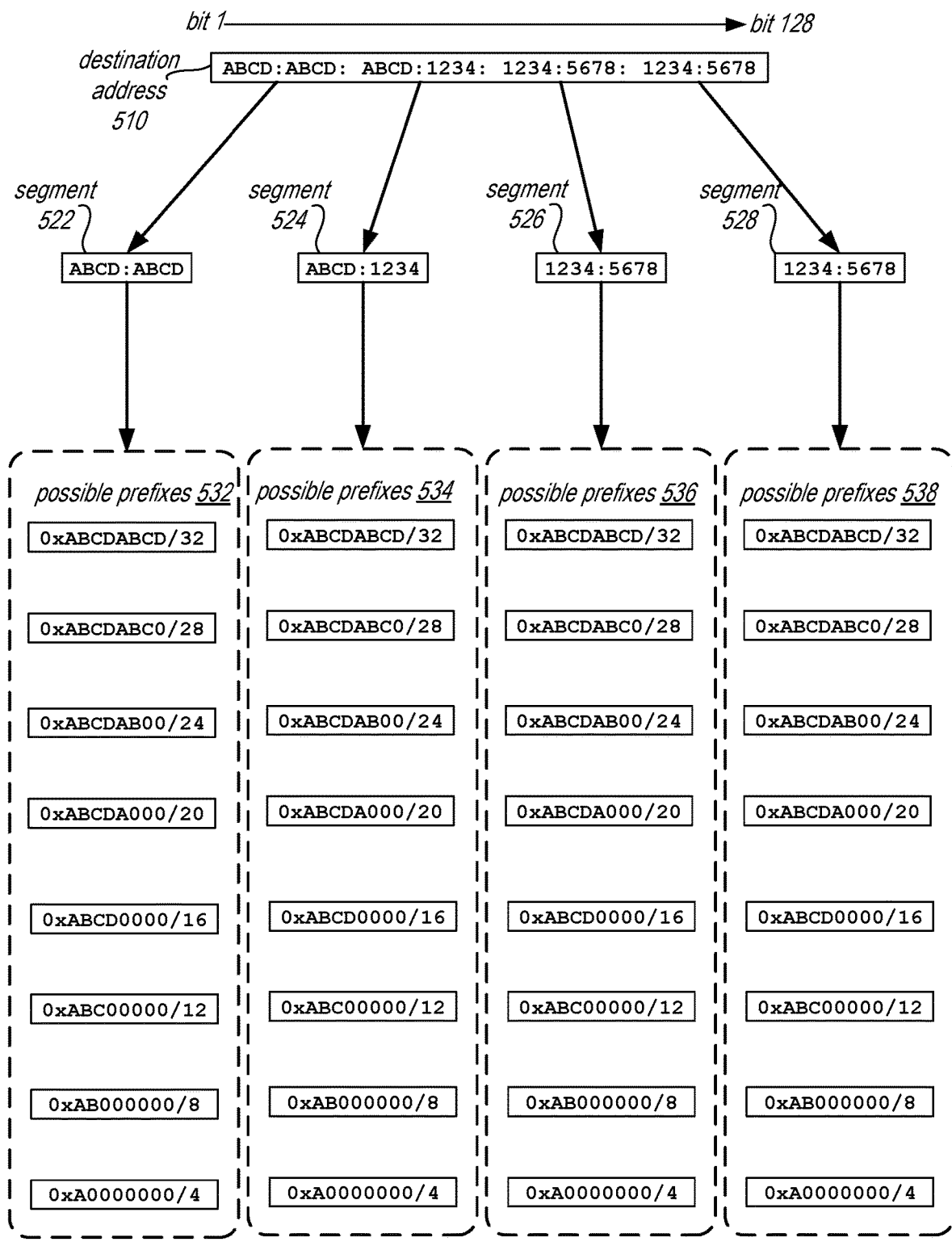
FIG. 5 is a logical diagram of a destination address divided into segments and possible prefix lengths, according to some embodiments.

FIG. 4 is a logical block diagram illustrating a forwarding engine that utilizes pipelined evaluations for algorithmic forwarding route lookups, according to some embodiments. L3 forwarding engine 400 may be one of many forwarding and/or decision engines implemented as part of packet forwarding engines 340. A destination address 402 may be received as part of packet metadata for a network packet. Possible prefix generation stage 410 may divide the destination address 402 into different possible prefix lengths. For IPv6 packets, possible prefix generation stage 410 may first divide the network packet into different segments, such as 32 bit segments, before dividing the different segments into different possible prefix lengths. FIG. 5 is a logical diagram of a destination address divided into segments and possible prefix lengths, according to some embodiments.

Destination address 510 may be an IPv6 network address, 128 bits long (depicted in hexadecimal format). Each 32 bit portion of destination address 510 may be divided into a separate segment, such as segments 522, 524, 526, and 528. Thus the first 32 most significant bits "ABCD:ABCD" are in a first segment 522, then the next most significant bits "ABCD:1234" are a next segment 524, and so on. In turn, each of these segments may be divided into different possible prefixes, such as possible prefixes 532, 534, 536, and 538. In FIG. 5, different prefix lengths are illustrates as lengths in multiples of 4 bits (e.g., 32, 28, 24, 20, 160, 12, 8, and 4). Note that possible prefixes of less significant segments are considered to include the full prefix length (of 32 bits) of more significant segment(s). For example, possible prefix lengths of segment 524 (32, 28, 24, 20, 16, 12, 8, and 4) are inclusive of the full 32 bits of segment 522 and represent possible prefix lengths of 64, 60, 56, 52, 48, 44, 40, and 36. Likewise possible prefix lengths of segment 526 and 528 are inclusive of the previous 64 or 96 bits of the more significant segments 524 (and 526). In this way, an evaluation of an IPv6 destination address though performed for in four segments still evaluates potentially prefix lengths from 4 to 128 (shorter prefix lengths may be evaluated according to a short route table). Also note that in other embodiments different prefix lengths may be implemented (e.g., by increments of 1, multiples of 2, etc.), and thus the previous examples are not intended to be limiting. In some embodiments, the prefix lengths may be determined based on route aggregation and/or other techniques that allow for multiple forwarding routes to be shared in a single route entry.

Although destination address 510 is an IPv6 network address, similar techniques may be performed to generate possible prefixes, such as different prefix lengths for 32, 28, 24, 20, 160, 12, 8, and 4 bits for a 32 bit IPv4 destination address. As with IPv6 destination addresses, other possible prefix lengths may be implemented for IPv4 destination addresses than those depicted.

Once generated, possible prefixes 412 may be provided to hash table entry selection stage 420 in order to select different segments of the hash table to read, and to generate hash keys or values that determine which hash table entries in a selected segment are to be read at hash table lookup 430. Hash table entry selection stage 420 may identify which hash table segment is searched for a possible prefix. By searching different hash table segments for different possible prefixes, parallel lookup operations may be performed for the possible prefixes. For example, a distribution function or other mechanism may be implemented when storing forwarding routes (as discussed below with regard to FIG. 10) into the routing table so that each possible prefix may only be stored (if it is stored) in one of the different segments of the routing table. In this way the corresponding segments of the hash table identified for prefixes may only be searched for one prefix without having to search each segment of the hash table for each prefix.

Figure 6:
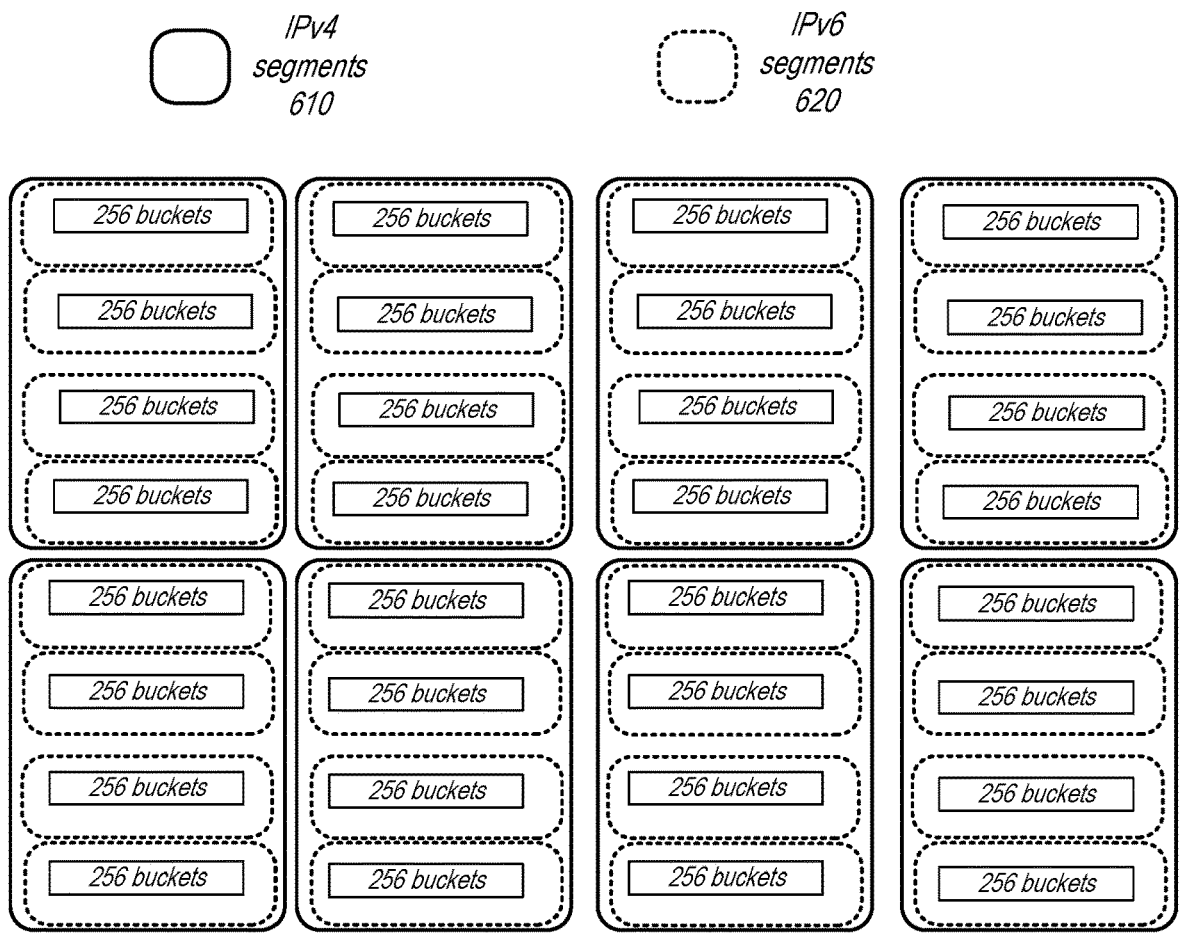
FIG. 6 is a logical block diagram illustrating memory organizations for a hash table maintaining forwarding routes, according to some embodiments.
Figure 6:
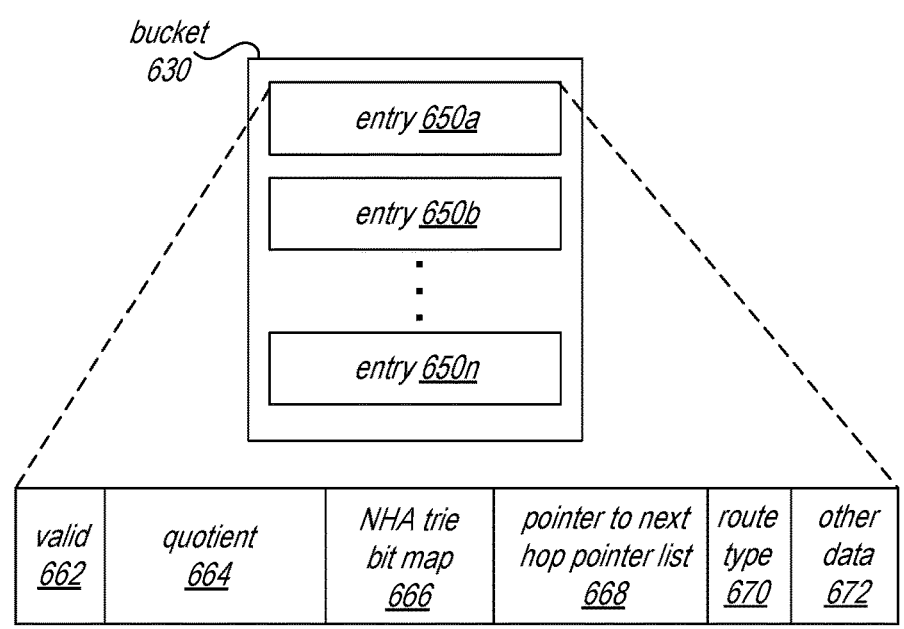

Hash tables may be logically organized in memory in different ways depending on the type of network packet. FIG. 6 is a logical block diagram of memory organizations of a routing hash table maintaining forwarding routes, according to some embodiments. For example, a hash table may be organized into multiple buckets, such as bucket 630, each of which contains a number of entries, such as entries 650a through 650n. Buckets may be mapped to different segments of hash table. Bucket mappings may differ for processing IPv4 or IPv6 network packets (though the underlying bucket and entry data may stay the same). For instance, IPv4 segments 610, may include different numbers of buckets, such as 1024 buckets per segment, in 8 segments, as illustrated in FIG. 6 (e.g., 256 buckets*4=1024 buckets), whereas IPv6 segments 620 may include 256 buckets per segment, in 32 segments. Each segment may have an associated identifier. To determine which segment corresponds to which possible prefix, the same distribution function or mechanism may be utilized as is utilized when storing a forwarding route in order to calculate the segment identifier (e.g., segment identifier=(4 most significant bits of the destination address+(possible prefix length/4)−1) % 8). Note that the segment identifiers for IPv4 segments 610 may be different than the segment identifiers of IPv6 segments 620.

Entries may contain various information to identify forwarding routes. Valid field 662 may identify whether or not NHA trie bitmap 666 is valid. If not valid, then no routes may be aggregated for the entry. Quotient indication 664 may be the representation of the prefix, NHA trie bitmap 666 may in some embodiments be a bitmap that identifies both the truncated bits of forwarding routes as a result of rounding down the forwarding route to the prefix length and identify the particular NHA pointers of a list of pointers that corresponds to the different forwarding routes identified in the bitmap. Note that various other data structures may be implemented to store aggregated routes and/or to determine a next hop address for a forwarding route. Thus, the previous examples are not intended to be limiting as to the various ways in which next hop address (NHA) mapping information may be stored in an entry. Route type field 670 may indicate whether the entry is an IPv4 or an IPv6 destination address. Other data field 672 may indicate other information such as whether or not the entry is migrated, the hash key value for the entry, the hash key value for a linked entry prior to the entry, and a length of the prefix.

The organization of data within entries may, in some embodiments, be the same. In this way, the entries themselves can be utilized when processing different types of network packets (e.g., IPv4 or IPv6). Instead of reading separate tables or memory components for different packet types, the, the selection of which segments of the hash table to read may change depending on the packet type by determining different segment identifiers for possible prefixes.

Hash table entry selection stage 420 may determine hash keys or values for the different possible prefixes 412. For example, hash table entry selection stage 420 may generate remainder quotient pairs for each possible prefix in accordance with a hash scheme based on polynomial division. In order to perform the division, a possible prefix may be shifted to the right and padded with values from a constant value in order to equal 32 bits. A same polynomial function may be utilized to determine remainder and quotient pairs for each possible prefix 412. Note that the polynomial function may be different for different types of network packet (e.g., degree-16 polynomial for IPv4 network packets and a degree-12 polynomial for IPv6 network packets).

In at least some embodiments, virtual routing and forwarding (VRF) may be implemented for network packets. VRF may allow for different virtual instances of a same underlying routing table to co-exist. A VRF identifier may be determined for network packets which identifies the particular routing table instance to use when making a forwarding decision. A VRF identifier may be determined for a network packet at one or more prior forwarding engines 350. For network packets with VRF enabled, polynomial division stage 420 may prepend the VRF identifier to the possible prefix and generate the quotient remainder pair based on the combined VRF identifier and possible prefix length value. For example, if an 8 bit possible prefix length (e.g., "10101010") is padded with bits from a constant with ("KKKKKKKKKKKKKKKKKKKKKKKK10101010") is to be divided, then a 4 bit VRF identifier (e.g., "1111") may be prepended to the 32 bits to equal a 36 bit value which is divided (e.g., "1111KKKKKKKKKKKKKKKKKKKKKKK-KKK10101010").

As illustrated in FIG. 4, the prefix remainders generated and segment identifiers determined for the possible prefix lengths may be provided 422 to hash table lookup stage 430. Hash table lookup stage 430 may utilize the remainder for a possible prefix length to access a bucket identified by the remainder in the hash table segment identified for the possible prefix. As multiple entries may be stored in a bucket, the entries contained therein may be evaluated at a subsequent evaluation stage, such as evaluation stages 440 through 470. Thus, when reading the entry values for the prefix remainders, all of the entries in the bucket may be read, in some embodiments. Hash table lookup stage 430 may perform hash table lookups to read a bucket in each of the different segments for the network packet (e.g., read 8 segments to obtain 8 buckets for an IPv4 packet or read 32 segments to obtain 32 buckets for an IPv6) in parallel.

The read entry values 432, including the stored quotient values) from the entries in the identified buckets may each be provided to a respective destination address segment evaluation stage. Segment evaluation stages 440, 450, 460, and 470, may each evaluate a different 32 bit segment of the destination address to determine if a prefix match exists within the read entries for the prefix lengths within that segment. Thus, segment evaluation stage 440 may evaluate prefix lengths within the most significant 32 bits (e.g., bits 1 to 32, such as possible prefixes 532 in FIG. 5), segment evaluation stage 450 may evaluate prefix lengths within the next most significant 32 bits (e.g., bits 33 to 64, such as possible prefixes 534 in FIG. 5), segment evaluation stage 460 may evaluate prefix lengths within the next most significant 32 bits (e.g., bits 65 to 96, such as possible prefixes 536 in FIG. 5), and segment evaluation stage 450 may evaluate prefix lengths within the next most significant 32 bits (e.g., bits 97 to 128, such as possible prefixes 538 in FIG. 5).

For example, using the prefixes illustrated in FIG. 5, segment evaluation stage 440 may receive the entries for the 8 buckets identified for the prefixes. The quotient values stored in the entries may be compared with the prefix quotient 424 generated at polynomial division 420 to determine a matching entry. Up to one entry in a bucket may match the quotient. Then from those matching entries for each of the buckets, the entry with longest prefix is selected as the longest matching prefix for segment evaluation stage 440. Note that in some scenarios no buckets may have an entry with a matching quotient, resulting in no forwarding route found to be matching at that segment. Matching indication 442 may be provided which identifies the matching entry to segment evaluation stage 450. Segment evaluation stage 450 may perform the same evaluation with respect to entry values from buckets identified for the prefixes within the next segment (e.g., possible prefixes 534). If a match is found and if the matching prefix length of segment evaluation stage 440 is 32, then an indication of that match 452 will be passed to segment evaluation stage 460, superseding the match identified in 440 (as segment evaluation stage 450 evaluates segments that are a part of a longer portion of the forwarding route (bits 33 to 64)). If no match is found or the matching prefix length indicated for segment evaluation stage 440 is not 32, then the matching entry from segment evaluation stage 440 may be passed through at indication 452. Moreover, as segment evaluation stage 450 detected no match, segment evaluation stages 460 and 470 may clock the matching entry through, via indications 462 and 472, to perform the next hop pointer lookup. Segment evaluation stages 460 and 470 may be perform similar techniques, evaluating entry values for the respective buckets and passing forward prior matching indications, new matching indications, or indications of no match.

Note that IPv4 destination addresses are evaluated within segment evaluation stage 440 according to the same processing components and logic. The result is passed through the next stages 450 through 470 (via indications 442, 454, 462, and 472) in order to perform an NHA pointer determination at 480.

Next hop pointer lookup 480 may provide a list of pointers to an NHA table. A pointer determined based on the trie bitmap in the entry may be used to perform a lookup operation with respect to the list of pointers, and provide NHA pointer 404 for further processing. In the event that no forwarding route is identified, a short route table, as discussed below with regard to FIGS. 8 and 9, may be implemented to search for forwarding routes less than the shortest possible prefix length or to provide a default route.

The examples of pipelined evaluations for algorithmic forwarding route lookups as discussed above with regard to FIGS. 2-6 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may pipelined evaluations for algorithmic forwarding route lookups. In addition to examples given above, the techniques discussed below with regard to FIGS. 7-9 may be also implemented using the various components discussed above as well as different types of systems or devices that perform packet processing.

FIG. 7 is a high-level flowchart illustrating various methods and techniques to implement pipelined evaluations for algorithmic forwarding route lookups, according to some embodiments. Forwarding routes may be maintained in a hash table in one or more entries. Different types of forwarding routes may be maintained in a different number of entries. For instance, IPv4 forwarding routes may be maintained in one entry, for the entire 32 bit route, whereas IPv6 forwarding routes may be maintained in 4 different entries, each corresponding to a different 32 bit segment of the IPv6 forwarding route (as illustrated in FIG. 5 above). The forwarding routes may be maintained in a memory accessible to a packet processor so that the shared entries may be accessed by the packet processor. Similarly, the memory may be accessible to other computing devices, such as a general purpose processor executing program instructions on another memory to perform routing table management operations, including inserting or removing forwarding routes.

As indicated at 710, a network packet may be received at the packet processor. Network packets may be a discrete portion of the stream of data transmitted over various types of network connections, such as twisted pair connections, coaxial connections, or fiber optic connections, or other wired or wireless connections formatted according to various transmission protocols to a destination address. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different packet modifications, however, may be inserted to encapsulate data at differing levels of the OSI model, such as layer 2, layer 2.5, layer 3, and layer 4.

As indicated at 720, the destination address for the network packet may be divided into different possible prefix lengths, as discussed above with regard to FIG. 5. For instance, prefix lengths that are multiples of 4 bits may be obtained, such as 4, 8, 12, 16, 20, 24, 28, and 32 bit length prefixes. For IPv6 network packets, 32 bit segments may be first determined and the different possible prefix lengths determined from the different 32 bit segments, so that possible prefix lengths of 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, 124, and 128 may be evaluated by considering the results of different evaluation stages for each of the destination address segments in combination.

As indicated at 740, different entries in the hash table maintaining the forwarding routes may be determined for the different possible prefix lengths according to the hash scheme for the table. In at least some embodiments, the hash scheme may be a scheme that associates hash buckets with remainders generated by performing polynomial division with respect to forwarding routes and storing the generated quotients in entries of the associated hash buckets in the hash table. Thus, to determine the entry for a possible prefix of the destination address, the same polynomial division may be performed to generate a quotient and remainder, with the remainder identifying the hash bucket (including entries associated with the hash bucket) as entries to be accessed. Such a technique may be performed for each possible prefix length. In at least some embodiments, different hash table segments may be identified for the different possible prefix lengths. The remainder for a possible prefix length may be used to identify the hash bucket in the corresponding segment of the hash table identified for the possible prefix length.

In some embodiments, as indicated at 730, virtual routing and forwarding (VRF) may be enabled for network packet. If so, the VRF identifier may be included when determining which entries to access in a hash table. For example, as indicated at 732, a VRF identifier (which indicates the virtual instance of the routing table to use) may be prepended to the different possible prefix lengths. When the polynomial division is performed to generate the different respective remainders and quotients for the possible prefix lengths, the combined VRF identifier and possible prefix length may be divided.

As indicated at 750, the different entries may be accessed in order to read the entry values for the different entries. As noted above, in some embodiments, all entries of a bucket may be read. The values of the entries may be evaluated to identify an entry maintaining a forwarding route that is a longest prefix match for the destination address, as indicated at 760, in various embodiments. For instance, in at least some embodiments, the stored quotient values in entries of a bucket will be compared with the generated quotient value of the different possible prefix length (which generated the remainder value that identified that bucket). If a matching entry is found, then that possible prefix length has a matching forwarding route. The longest of the matching entries will be identified (e.g., by comparing prefix length values and/or determining which segment the match is found in). In at least some embodiments, no matching entry may be identified, as indicated by the negative exit from 770 a short route table may be accessed to determine a forwarding route for the network packet, as indicated at 772 and discussed below with regard to FIGS. 8 and 9. In some embodiments, network packets that do not return a match at the routing table or the short route table are dropped.

As indicated at 780, the network packet may be forwarded according to the forwarding route identified for the network packet. In some embodiments, modifications to the network packet, such as tunnel header insertions, metadata modifications, and other packet operations may be performed dependent upon the selected forwarding route.

Figure 8:
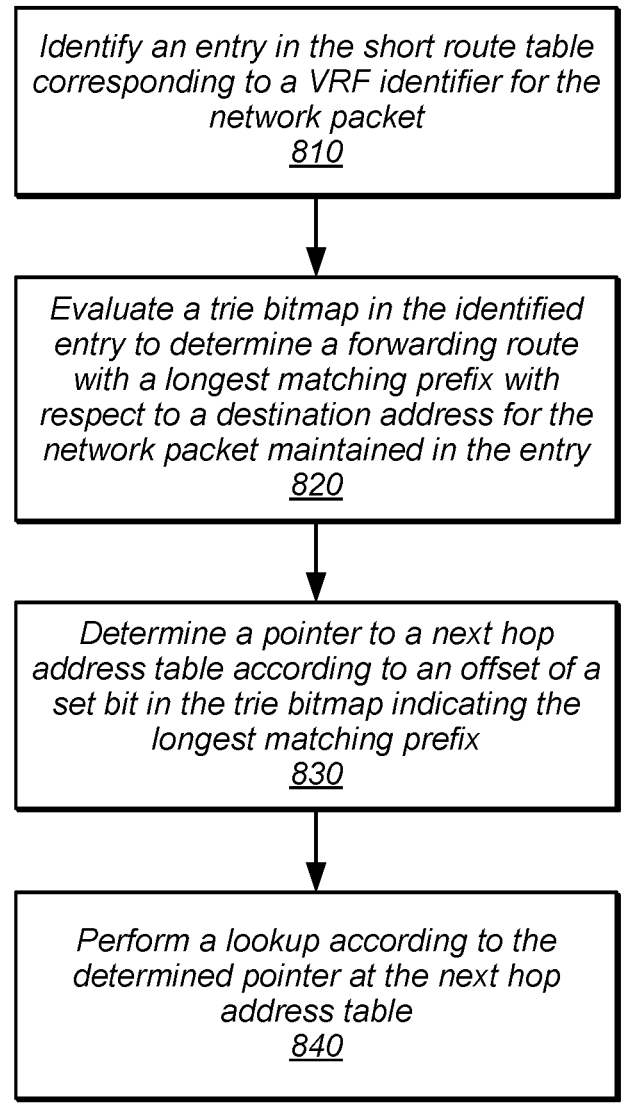
FIG. 8 is a high-level flowchart illustrating various methods and techniques to determine a forwarding route at a short route table, according to some embodiments.

Short route tables may provide forwarding routes that are shorter than a smallest evaluated possible length prefix (e.g., prefix lengths of less than 4 bits). Short route tables may also provide a default forwarding route, in some embodiments. FIG. 8 is a high-level flowchart illustrating various methods and techniques to determine a forwarding route at a short route table, according to some embodiments. As indicated at 810, an entry in the short route table corresponding to a VRF identified for the network packet may be identified. For example, a short route table may be configured so that different entries are indexed according to a numerical VRF identifier. If the VRF identifier is, for instance, "0010," then the second entry in the short route table may be accessed.

Figure 9:
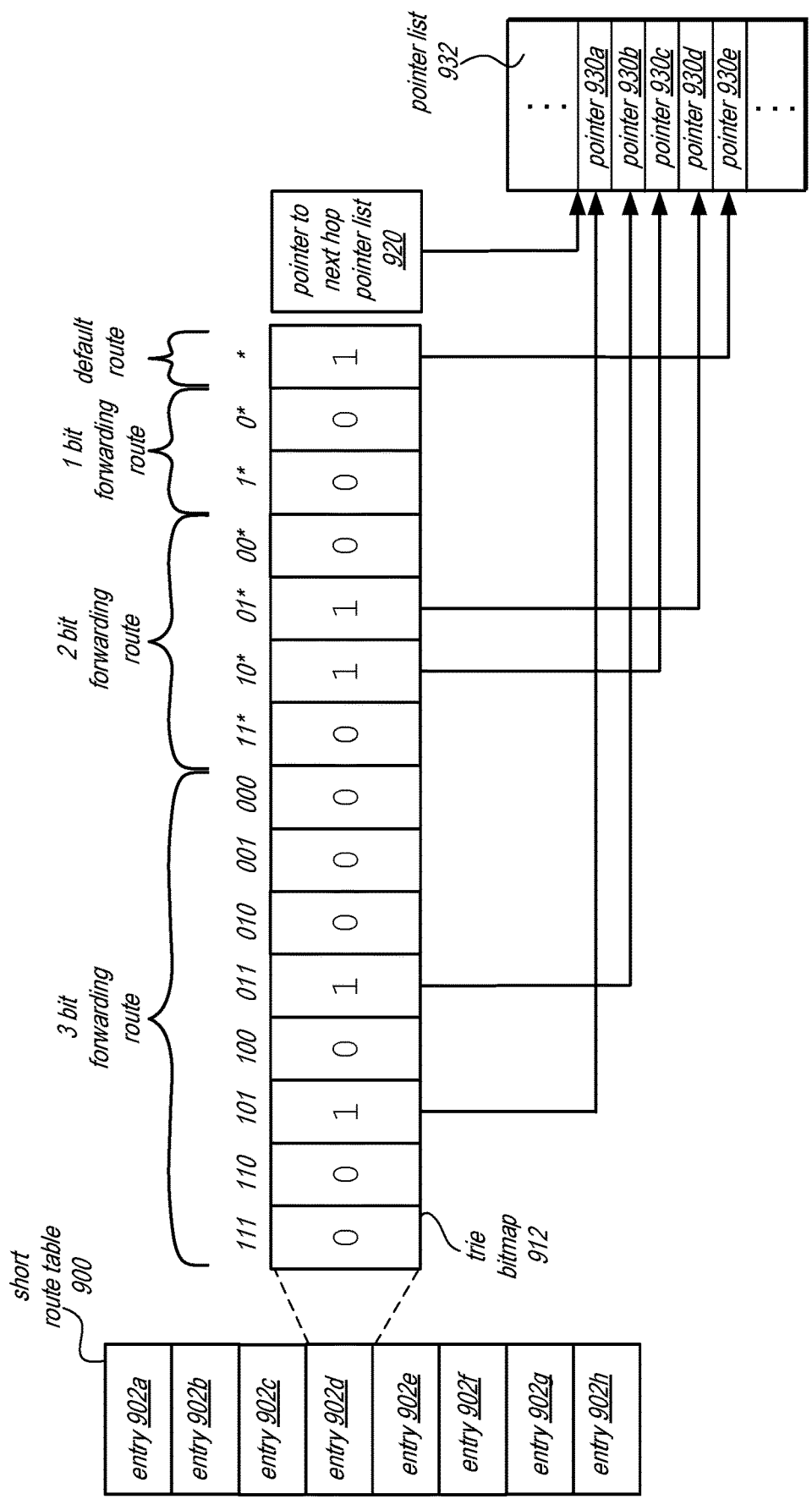
FIG. 9 is a logical block diagram of a trie bitmap in an entry of short route table, according to some embodiments.

In at least some embodiments, a short route table entry may be represented as a trie bitmap. In this way, all of the different short routes associated with the particular instance of the routing table identified by the VRF identifier may be described or aggregated in a single entry. FIG. 9 is a logical block diagram of a trie bitmap in an entry of short route table, according to some embodiments. Short route table 900 includes multiple entries, 902a through 902h, each of which may correspond to different virtual instances of a routing table. Note that both IPv4 and IPv6 short routes may be stored in different entries of the same routing table.

Entry 902d may include trie bitmap 912. Trie bitmap may have different bit fields which correspond to different combinations of bits in a short route. For instance, as illustrated in FIG. 9, trie bitmap 912 aggregates routes of 3 bits or less. The first 8 bit fields represent the different 3 bit route combinations, the second 4 bit fields represent the 2 bit forwarding route combinations, and the next 2 bit fields represent the 1 bit forwarding route combinations, and the final bit field represents the default route (which may always be set). When evaluating the trie bitmap, as indicated at 820, the longest matching prefix with respect to the destination address for the network packet may be identified. For example, the 3 most significant bits of the destination address, the 2 most significant bits, and the 1 most significant bits may be compared with the corresponding entries and if set represent a match. For instance, if the 3 bits are "011," then the set bit indicates a forwarding route match. The longest matching bit may be the most significant of the bits that are set.

As indicated at 830, a pointer to a next hop address table may be determined according to an offset of a set bit in the trie bitmap indicating the longest matching prefix. For example, as illustrated in FIG. 9, if the longest matching route is "101," then the offset from the pointer 920 (which is also included in the short route table entry) to pointer list 932 (e.g., pointer lookup table 480 in FIG. 4) is offset by 1, resulting in pointer 930*a*. Once the pointer is determined, then as indicated at 840, a lookup may be performed at the next hop address table according to the determined pointer.

Figure 10:
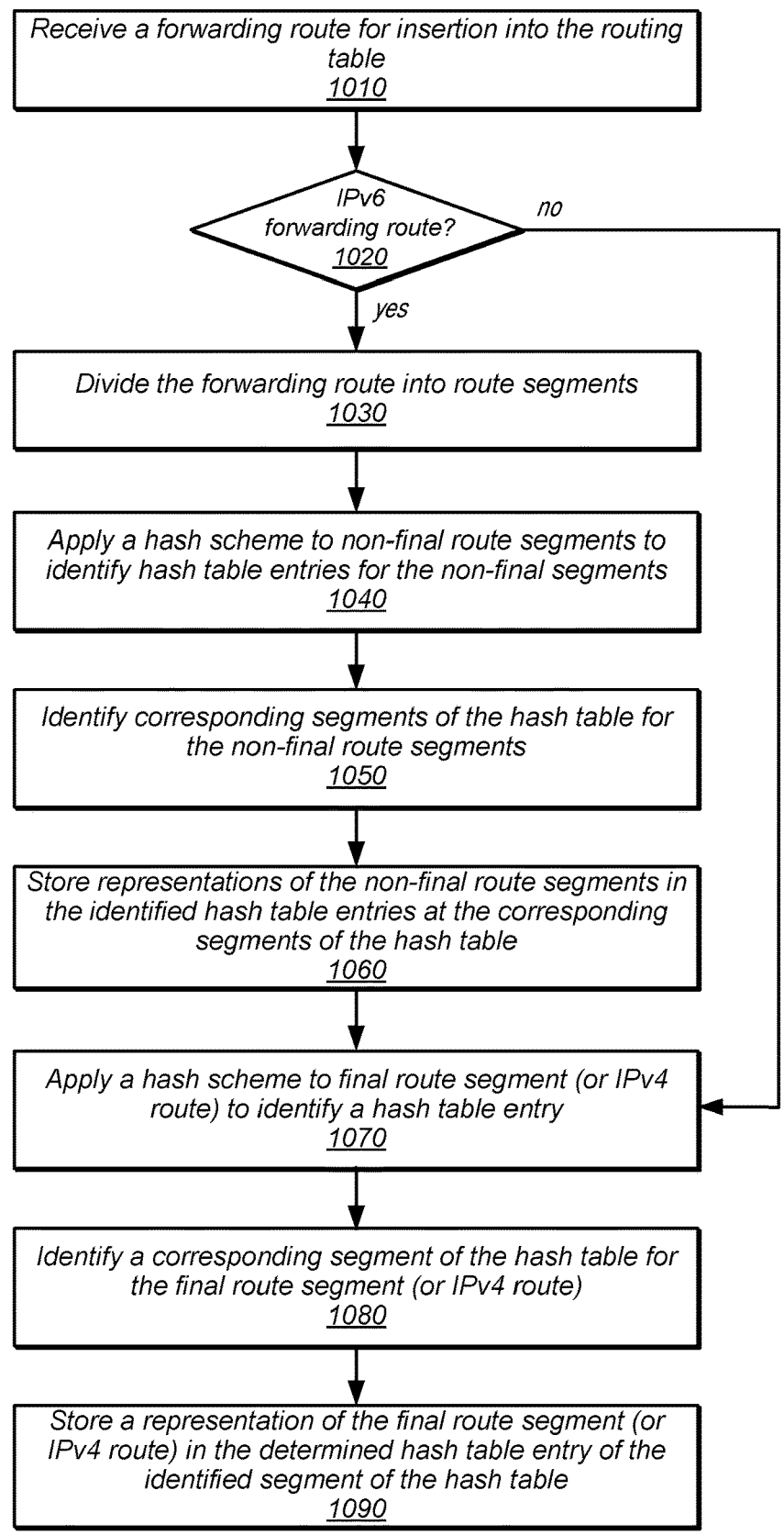
FIG. 10 is a high-level flowchart illustrating various methods and techniques to insert a forwarding route for pipelined evaluations, according to some embodiments.

In order to ensure that the different entries of forwarding routes are distributed throughout a hash table so that access for performing a longest prefix match may be performed in parallel for pipelined evaluation stages, a distribution function or mechanism may be implemented when inserting forwarding routes into the hash table. FIG. 10 is a high-level flowchart illustrating various methods and techniques to insert a forwarding route for pipelined evaluations, according to some embodiments.

As indicated at 1010, a forwarding route may be received for insertion into the routing table. A management application, controller or other process operating on a general purpose processor at or connected to a networking device may provide an interface that allows user to identify forwarding routes for insertion, such as program instructions 245 executing on general processor(s) 250 in FIG. 2, for example. In at least some embodiments, the type or format of the forwarding route may be determined. For instance, as indicated at 1020, a determination may be made as to whether the forwarding route is an IPv6 route. If not, then fewer or different steps may be performed to insert the IPv4 forwarding route, as illustrated by the negative exit from 1020 to element 1060. For example, an IPv4 forwarding route may be treated as a final segment in the elements discussed below at 1060 through 1090.

For IPv6 forwarding routes being inserted into the routing table, the forwarding route may be divided into segments, as indicated at 1030. Similar to the divisions described above with regard to FIG. 5, the destination address may be divided into 32 bit segments (although other divisions may be performed and thus the previous example is not intended to be limiting). As indicated at 1040, a hash scheme for the hash table may be applied to the non-final segments to identify hash table entries for the segments. For instance, in the example hash scheme described above, a quotient and remainder for the segment may be obtained based on a modulo 2 division of the segment value by a predetermined polynomial, wherein the remainder is used as the index to identify a corresponding entry in the hash table and the quotient is stored in the bucket for identification and comparison. As indicated at 1050, corresponding segments of the hash table may be identified for the non-final route segments. For example, a distribution function or mechanism may be applied which guarantees that the location of different possible lengths of the 32 bit segments (e.g., according to multiples of 4 as noted above or according to other multiples utilized for possible prefix length determination) would be in different respective segments of the hash table (in an entry in a bucket in only one of the 32 segments of the hash table illustrated in FIG. 6). In some embodiments, the distribution function or mechanism may generate a segment identifier such that the combination of a quotient, remainder, and segment identifier for a segment may be unique amongst all of the entries of the hash table. As indicated at 1060, representations of the non-final segments (e.g., the quotients) may be stored in the identified hash table entries that correspond to the non-final segments. In at least some embodiments, representations of the segments may be mathematically chained to other non-final segments of the forwarding route that may include information indicating or derived from a previous segment in the chain of forwarding route segments (e.g., the quotient value for the segment XOR'd with the remainder value for the previous segment in the chain). In this way, the relative position of the segments can be determined to select the longest matching portion in common with a destination address. In some embodiments, if the entries with a same value for the non-final segment already exist and include such representations, then the storage of the representations at 1060 may be skipped. If no entry in an identified segment (according to the segment identifier) and bucket (according to the remainder) is available for storing the representation, then the forwarding route may not be stored, in some embodiments.

Similar to 1040 above, a hash scheme may be applied to the final route segment (or IPv4 route) to identify a hash table entry, as indicated at 1070. In some embodiments, the final segment of the forwarding route (or IPv4 route) may be rounded down to a prefix multiple. A prefix multiple, as mentioned above, indicates the different desired common portion lengths that may be represented in hash table entries. For instance, the common portion lengths may be a multiple value greater than the number of possible truncation bits represented in a route aggregation map (e.g., multiples of 4 which would be greater than truncation bit lengths of 3 bits, 2 bits, or 1 bit), such as trie bitmap 666 in FIG. 6. Rounding down a final segment may round down the segment value to a nearest prefix multiple. Consider the example final segment given above, EEFF:1122/30, which may be rounded down to EEFF:1120/28 (where the truncated 2 bits indicate a value of 2). Similar to 1050 above, a corresponding segment of the hash table may be identified for the final route segment (or IPv4 route), as indicated at 1080. Again, the distribution function or mechanism may be applied to determine a segment identifier which maps to one of the segments in the routing table for that type of network packet (e.g., a segment identifier for an IPv6 segment or a segment identifier for an IPv4 segment). As indicated at 1090, a representation of the final segment (or IPv4 route) may be stored in an entry identified according to the hash scheme in the segment of the hash table identified at 1080. For example a quotient value calculated for the rounded final segment may be stored in an available entry of a bucket identified according to a remainder value in an identified segment. In some embodiments, the representation may be the rounded down segment (or IPv4 route) and may be stored by shifting the rounded segment value to the right so that trailing bits generated by the rounding are not included. Bit values from a constant value may be used to replace the most significant bit values adjacent to the shifted segment value to generate a "full" segment." This full segment may then have the same hash scheme applied (e.g., generating a quotient and remainder). As with the representations discussed above with regard to element 1060, the representation of the non-final segment may be chained or linked to previous non-final segments for the forwarding route (e.g., by XORing the remainder of the previous non-final segment with the quotient determined for the final segment).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the prepended claims, features from dependent claims may be combined with those of the independent claims and features from respective independent claims may be combined in any appropriate manner and not merely in the specific combinations enumerated in the prepended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
   a plurality of physical network interfaces;
   a memory, configured to store a short route table for different types of network packets; and
   a packet processor, configured to:
      receive a network packet via one of the physical network interfaces;
      determine that a longest prefix match for the network packet is not found in a forwarding table;
      identify, responsive to the determination, an entry in the short route table corresponding to the network packet;
      evaluate a trie bitmap in the identified entry of the short route table to identify a forwarding route that is the longest prefix match for the network packet;
      determine a pointer to a next hop address table according to an offset of a set bit in the trie bitmap that indicates the longest prefix match for the network packet; and
      forward the network packet according to a lookup performed at the next hop address table according to the determined pointer via one of the physical network interfaces.

2. The networking device of claim 1, wherein the packet processor is further configured to:
   receive a second network packet via one of the physical interfaces;
   determine another entry in the short route table corresponding to the second network packet;
   evaluate a trie bitmap in the second entry of the short route table to determine a default route is to be used for the second network packet; and
   forward the second network packet according to the default route via one of the physical network interfaces.

3. The networking device of claim 1, wherein to determine the entry in the short route table corresponding to the network packet, the packet processor is configured to determine the entry according to a virtual routing and forwarding (VRF) identifier associated with the network packet.

4. The networking device of claim 1, wherein to determine the pointer to the next hop address table according to the offset of the set bit in the trie bitmap, the packet processor is configured to apply the offset to a pointer to a pointer lookup table that includes the pointer to the next hop address table, wherein the pointer to the pointer lookup table is included in the entry of the short route table.

5. The networking device of claim 1, wherein the different types of network packets comprise Internet Protocol version 4 (IPv4) and Internet Protocol version 6 (IPv6).

6. A method, comprising:
   receiving a network packet at a packet processor;
   determining, by the packet processor, that a longest prefix match for the network packet is not found in a forwarding table;
   identifying, by the packet processor responsive to the determining, an entry in a short route table corresponding to the network packet;
   evaluating, by the packet processor, a trie bitmap in the identified entry of the short route table to identify a forwarding route that is a longest prefix match for the network packet;
   determining, by the packet processor, a pointer to a next hop address table according to an offset of a set bit in the trie bitmap that indicates the longest prefix match for the network packet; and
   forwarding, by the packet processor, the network packet according to a lookup performed at the next hop address table according to the determined pointer.

7. The method of claim 6, further comprising:
   receiving, at the packet processor, a second network packet;
   determining, by the packet processor, another entry in the short route table corresponding to the second network packet;
   evaluating, by the packet processor, a trie bitmap in the second entry of the short route table to determine a default route is to be used for the second network packet; and
   forwarding, by the packet processor, the second network packet according to the default route.

8. The method of claim 6, wherein determining the entry in the short route table corresponding to the network packet comprises determining the entry according to a virtual routing and forwarding (VRF) identifier associated with the network packet.

9. The method of claim 6, wherein determining the pointer to the next hop address table according to the offset of the set bit in the trie bitmap comprises applying the offset to a pointer to a pointer lookup table that includes the pointer to the next hop address table, wherein the pointer to the pointer lookup table is included in the entry of the short route table.

10. The method of claim 6, wherein the entry of the short route table is stored for network packets of a first type of network protocol, and wherein another entry of the short route table is stored for network packets of a second type of network protocol.

11. The method of claim 6, wherein the packet processor is a general purpose processor executing program instructions that cause the general purpose processor to perform the receiving, the dividing, the accessing, the evaluating, and the forwarding as part of a Layer 3 (L3) forwarding engine.

12. A system, comprising:
a device configured to perform packet processing, the device comprising;
one or more network interfaces configured to transmit and receive packets via a network connection to the device;
a memory, storing a short route table for forwarding network packets; and
a packet processing pipeline, configured to:
receive a network packet via the one or more network interfaces;
determine that a longest prefix match for the network packet is not found in a forwarding table;
identify, responsive to the determination, an entry in the short route table corresponding to the network packet;
evaluate a trie bitmap in the identified entry of the short route table to identify a forwarding route that is the longest prefix match for the network packet;
determine a pointer to a next hop address table according to an offset of a set bit in the trie bitmap that indicates the longest prefix match for the network packet; and
forward the network packet via the one or more network interfaces according to a lookup performed at the next hop address table according to the determined pointer.

13. The system of claim 12, wherein the packet processing pipeline is further configured to:
receive a second network packet via the one or more network interfaces;
determine another entry in the short route table corresponding to the second network packet;
evaluate a trie bitmap in the second entry of the short route table to determine a default route is to be used for the second network packet; and
forward the second network packet according to the default route via the one or more network interfaces.

14. The system of claim 12, wherein to determine the entry in the short route table corresponding to the network packet, the packet processing pipeline is configured to determine the entry according to a virtual routing and forwarding (VRF) identifier associated with the network packet.

15. The system of claim 12, wherein to determine the pointer to the next hop address table according to the offset of the set bit in the trie bitmap, the packet processing pipeline is configured to apply the offset to a pointer to a pointer lookup table that includes the pointer to the next hop address table, wherein the pointer to the pointer lookup table is included in the entry of the short route table.

16. The system of claim 12, wherein the entry of the short route table is stored for network packets of a first type of network protocol, and wherein another entry of the short route table is stored for network packets of a second type of network protocol.

17. The system of claim 12, wherein the device is an application specific integrated circuit (ASIC), a system-on-chip (SoC), or a field-programmable gate array (FPGA).

* * * * *